(12) United States Patent
Saito et al.

(10) Patent No.: US 6,254,667 B1
(45) Date of Patent: Jul. 3, 2001

(54) METHOD OF TREATING CARBON DIOXIDE-CONTAINING GAS AND APPARATUS THEREFOR

(75) Inventors: Takayuki Saito, Tsukuba; Takeo Kajishima, Toyonaka; Katsumi Tsuchiya, Tokushima, all of (JP)

(73) Assignee: Director-General of Agency of Industrial Science and Technology (JP)

( * ) Notice: Subject to any disclaimer, the term of this patent is extended or adjusted under 35 U.S.C. 154(b) by 0 days.

(21) Appl. No.: 09/385,892

(22) Filed: Aug. 30, 1999

(30) Foreign Application Priority Data

Aug. 28, 1998 (JP) .................................................. 10-242912

(51) Int. Cl.$^7$ .................................................. B01D 19/00
(52) U.S. Cl. .................................. 95/254; 95/266; 96/193; 261/77; 261/93; 261/DIG. 7
(58) Field of Search ............................. 95/241, 254, 260, 95/266; 96/155, 181, 193, 204; 261/77, 93, DIG. 7

(56) References Cited

U.S. PATENT DOCUMENTS

| | | | |
|---|---|---|---|
| 3,794,303 | * 2/1974 | Hirshon | 261/77 |
| 4,045,336 | * 8/1977 | Isteri | 261/77 |
| 4,180,980 | * 1/1980 | Marks et al. | 96/193 |
| 4,239,150 | 12/1980 | Hays et al. | 55/68 |
| 4,293,506 | * 10/1981 | Lipert | 261/77 |
| 4,724,086 | * 2/1988 | Kortmann | 261/77 |
| 5,662,837 | 9/1997 | Saito et al. | 261/77 |
| 5,741,443 | * 4/1998 | Gemza | 261/77 |

OTHER PUBLICATIONS

Patent Abstracts of Japan, vol. 1996, No. 3.

* cited by examiner

*Primary Examiner*—Duane S. Smith
(74) *Attorney, Agent, or Firm*—Lorusso & Loud

(57) ABSTRACT

The apparatus of the present invention includes an inverted J-shaped pipe disposed under the sea and including shorter and longer open end portions, and a connecting portion joining them such that the shorter and longer portions extend downward from connecting portion to their respective open ends. An injector nut injecting the carbon dioxide-containing gas into a portion of said short pipe adjacent to said first open end into said shorter pipe. An accumulator is in fluid communication with the connecting portion for collecting gas, which remains undissolved in the seawater during the passage of the carbon dioxide-containing gas through said shorter pipe. According to the method of the invention, the injection of the carbon dioxide-containing gas forces the seawater to enter into first open end, to flow upward together with the carbon dioxide-containing gas through the shorter pipe portion, to flow downward through the longer pipe portion and to be discharged from the second open end, with the carbon dioxide being dissolved in the seawater during the passage of the carbon dioxide-containing gas through the shorter pipe portion, so that the seawater discharged from the second open end contains carbon dioxide dissolved therein.

5 Claims, 1 Drawing Sheet

METHOD OF TREATING CARBON DIOXIDE-CONTAINING GAS AND APPARATUS THEREFOR

BACKGROUND OF THE INVENTION

1. Field of the Invention

This invention relates generally to a method for the treatment, for global environmental protection, of a carbon dioxide-containing gas discharged in a large quantity from, for example, thermoelectric power plants and iron mills and, more specifically, to a method for dissolving carbon dioxide in seawater and discharging the carbon dioxide-dissolved seawater to a deep sea level. The present invention is also directed to an apparatus for carrying out the above method.

2. The Prior Art

U.S. Pat. No. 5,662,837 (Saito et al) discloses method and apparatus for dissolving carbon dioxide gas discharged from, for example, thermoelectric power plants into seawater and isolating it at a deep sea level. The apparatus includes an inverted J-shaped gas lift having a shorter pipe and a longer pipe connected with each other at a top of the J-shaped gas lift. The shorter pipe is held at a shallow sea level, while the longer pipe is opened at a deep sea level. When carbon dioxide gas is injected into the lower end of the shorter pipe, the seawater is introduced into the shorter pipe by gas lift action of the carbon dioxide gas. The carbon dioxide fed is completely dissolved into the seawater before it reaches the upper end of the shorter pipe. Because of an increased density of the seawater due to dissolution of carbon dioxide, because of a higher pressure within the upper end than an outside pressure and because of the force of inertia, the seawater is then moved down through the longer pipe and discharged from its lower end located at a deep sea level.

The above technique which does not require liquefaction of $CO_2$ gas and which ensures environmental protection is promising. However, the known method has a problem because the $CO_2$, gas to be treated should have a high purity and should not contain gases, such as $N_2$ and $O_2$, which are hardly soluble in seawater. Thus, such insoluble gases will be discharged from the end of the long pipe together with the $CO_2$-dissolved seawater to form a large amount of bubbles. Thus, prior to the treatment with the above apparatus, the $CO_2$ gas must be pretreated to obtain a high purity $CO_2$ gas at a large cost.

SUMMARY OF THE INVENTION

The present invention has been made to overcome the above problem of the known technique.

In accordance with one aspect of the present invention, there is provided a method of treating a carbon dioxide-containing gas, comprising:

providing a J-shaped pipe including a shorter pipe having a first open end, a longer pipe having a second open end, and a connecting portion by which said shorter and longer pipes are connected with each other, such that said first and second open ends represent opposite ends of said J-shaped pipe;

positioning said J-shaped pipe under the sea such that said shorter and longer pipes extend downward from said connecting portion;

injecting the carbon dioxide-containing gas into a portion of said shorter pipe adjacent to said first open end into said shorter pipe so that seawater is forced to enter said first open end, to flow upward together with the carbon dioxide-containing gas through said shorter pipe, to flow downward through said longer pipe and to be discharged from said second open end, with the carbon dioxide being dissolved in the seawater during the passage of the carbon dioxide-containing gas through said shorter pipe; and extracting an insoluble gas, which remains undissolved in the seawater during the passage of the carbon dioxide-containing gas through said shorter pipe, from the seawater in said connecting portion, so that the seawater discharged from said second open end contains carbon dioxide dissolved therein.

In another aspect, the present invention provides an apparatus for treating a carbon dioxide-containing gas, comprising:

an inverted J-shaped pipe disposed under the sea and including a shorter pipe having a first open end, a longer pipe having a second open end, and a connecting portion by which said shorter and longer pipes are connected with each other such that said shorter and longer pipes extend downward from said connecting portion with said first and second open ends representing opposite ends of said inverted J-shaped pipe;

injection means for injecting the carbon dioxide-containing gas into a portion of said short pipe adjacent to said first open end into said shorter pipe; and accumulation means in fluid communication with said connecting portion of said J-shaped pipe for collecting an insoluble gas, which remains undissolved in the seawater during the passage of the carbon dioxide-containing gas through said shorter pipe, from the seawater in said connecting portion, whereby, as a result of the injection of the carbon dioxide-containing gas by said injection means, the seawater is forced to enter said first open end, to flow upward together with the carbon dioxide-containing gas through said shorter pipe, to flow downward through said longer pipe and to be discharged from said second open end, with the carbon dioxide being dissolved in the seawater during the passage of the carbon dioxide-containing gas through said shorter pipe, so that the seawater discharged from said second open end contains carbon dioxide dissolved therein.

DESCRIPTION OF THE PREFERRED EMBODIMENTS

Figure 1:
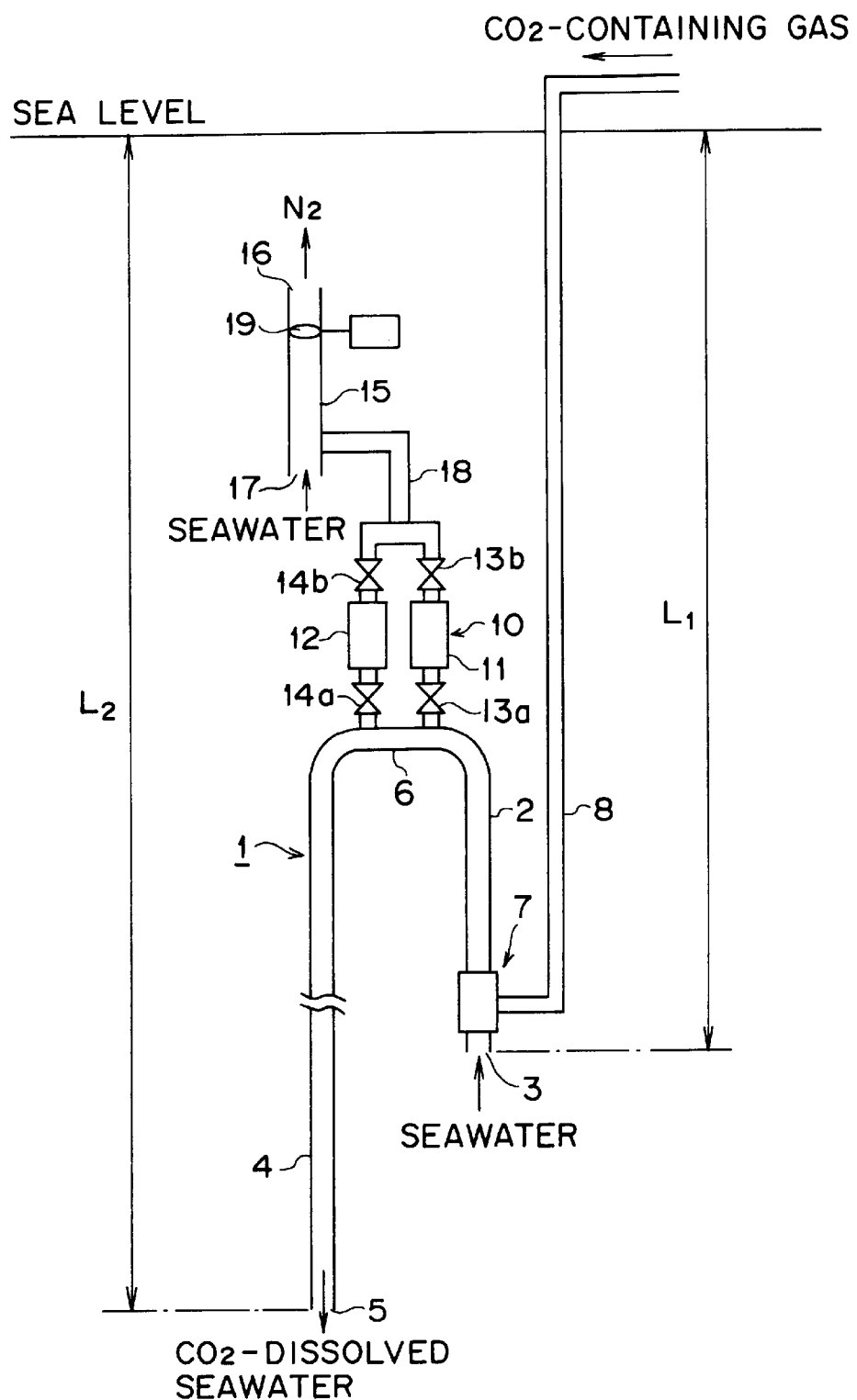
FIG. 1 is a vertical cross-sectional view diagrammatically illustrating an apparatus of treating a carbon dioxide-containing gas according to one embodiment of the present invention.

A $CO_2$-containing gas to be treated according to the present invention is an exhaust gas discharged from a thermal power plant, an iron mill, etc. and containing gases, such as $O_2$ and $N_2$, which are hardly soluble in seawater, in addition to $CO_2$. Such insoluble gases are generally present in an amount of 5–40% by volume. In the present invention, the $CO_2$-containing gas which additionally contains such insoluble gases is treated as such.

Referring to FIG. 1, an apparatus for treating a carbon dioxide-containing gas according to the present invention includes an inverted J-shaped pipe 1 disposed below the sea level. Suitable anchored floats (not shown) may be used for supporting the inverted J-shaped pipe in position. The inverted J-shaped pipe 1 has a shorter pipe 2 having a first open end 3, a longer pipe 4 having a second open end 5, and a connecting portion 6 by which the shorter and longer pipes 2 and 4 are connected with each other. Thus, the shorter and longer pipes 2 and 4 extend vertically or obliquely downward from the connecting portion 6 and terminate at the first and second open ends 3 and 5, respectively.

The depth $L_1$ at which the first open end 3 is positioned is preferably 300–400 m (with the length of the short pipe 2 being about 200–300 m), while the depth $L_2$ at which the second open end 5 is positioned is preferably 1,000–3,000 m. Thus, for example, the shorter pipe 2 may be disposed in a vertical position on a continental shelf, while the longer pipe 3 may extend obliquely downward along a continental slope and terminate deep in the sea.

Injection means 7 including a gas feed pipe 8, a pump (not shown) and nozzle means (not shown) is provided for injecting the carbon dioxide-containing gas into a portion of the short pipe 2 adjacent to the first open end 3.

By injection of the carbon dioxide-containing gas by the injection means 7, the seawater is forced to enter the first open end 3, to flow upward together with the carbon dioxide-containing gas through the shorter pipe 2, to flow downward through the longer pipe 4 and to be discharged from the second open end 5. During the passage of the carbon dioxide-containing gas through the shorter pipe 2, the carbon dioxide in the gas is nearly completely dissolved in the seawater. Therefore, the seawater discharged from the second open end 5 contains carbon dioxide dissolved therein.

Because of the injection of the carbon dioxide-containing gas from a lower portion of the shorter pipe 2, the pressure inside the connecting portion 6 is higher than the pressure outside thereof. This pressure increase corresponds to the pressure applied by the pump of the injection means 7. Additionally, the seawater flowing through the connecting portion has a force of inertia. Moreover, the seawater flowing through the connecting portion has an increased specific gravity due to the dissolution of carbon dioxide therein. Thus, the seawater supplied to the connecting portion 6 from the bottom opening 3 of the shorter pipe 2 flows downward from the connecting portion 6 to the bottom opening 5 of the longer pipe 4.

Referring still FIG. 1, designated generally as 10 is accumulation means in fluid communication with the connecting portion 6 of the J-shaped pipe 1 for collecting insoluble gases, such as $O_2$, and $N_2$, which remain undissolved in the seawater after the passage of the carbon dioxide-containing gas through the shorter pipe 2. As a consequence, the insoluble gases in the seawater flowing through the connecting portion 6 and the longer pipe 4 are separated therefrom and collected in the accumulation means 10 and, therefore, are prevented from being discharged from the end opening 5 of the longer pipe 4.

The accumulation means 10 preferably comprises a plurality of accumulators (two accumulators 11 and 12 in the illustrated embodiment) connected in parallel to the connecting portion 6 through valve means 13a and 14a operable so that the insoluble gases are continuously collected successively in respective accumulators 11 and 12.

More particularly, the accumulators 11 and 12 are alternately changed between an accumulation stage, where the insoluble gases are accumulated in the accumulator, and a discharge stage, where the insoluble gases accumulated in the accumulator are discharged therefrom, by operation of the valves 13a and 14a and valves 13b and 14b provided upstream and downstream of the accumulators 11 and 12, respectively. For example, when the accumulator 11 is in an accumulation stage, the valve 13a is opened and the valve 13b is closed. In this case, the valves 14a and 14b are closed and opened, respectively, so that the accumulator 12 is in a discharge stage, i.e., the accumulated gas is released from the accumulator 12. These operations are intermittently switched to continuously perform the extraction, collection and release of the insoluble gases.

The insoluble gases collected in the accumulators 11 and 12 have a high pressure and are advantageously utilized for the recovery of the energy in the form of electrical energy. Thus, a vertical pipe 15 having top and bottom open ends 16 and 17 is disposed under the sea. The vertical pipe 15 has a portion adjacent the bottom end 17 which is connected to the accumulation means 10 through a connecting pipe 18. An impeller 19 of a generator is provided within the vertical pipe 15. The insoluble gases collected by the accumulation means 10 are introduced into the vertical pipe 15 and allowed to flow upward through the vertical pipe 15. As a consequence, seawater is forced to enter the bottom opening 17 of the vertical pipe 15 and to flow upward therethrough, so that the impeller 19 is rotated. Thus, the kinetic energy of the insoluble gases is recovered as electrical energy by the generator.

In practice, a multiplicity of the above inverted J-shaped pipes are used. In this case, a manifold is used for connecting the inverted J-shaped pipes with a gas pipeline through which a $CO_2$-containing gas from, for example, a thermal power plant is fed.

The following example will further illustrate the present invention.

EXAMPLE

An experiment was carried out using an apparatus as shown in FIG. 1 having a J-shaped pipe with a total length of 8 m and an inside diameter of 25 mm. A mixed gas containing 80% by volume of $CO_2$ and 20% by volume of $O_2$ and $N_2$ was injected. About 2.4 g of $CO_2$ was able to be treated per minute. In this case, the seawater flow rate in a shorter pipe was 0.4 m/sec. On the basis of the results of the above experiment, a computer simulation was conducted for a J-shaped pipe having a length of 200 m and an inside diameter of 150 mm. As a result, it was revealed that about 1 kg of $CO_2$ was able to be treated per minute with a seawater flow rate in a shorter pipe being about 2 m/sec. The kinetic energy of insoluble gases recovered in a vertical pipe was about 0.6 J per unit mass flow rate. Even if only 10% of the recovered energy is able to be converted by a generator, the electrical energy thus obtained will be sufficient to power all of the above system.

What is claimed is:

1. A method of treating a carbon dioxide-containing gas, comprising:

providing an inverted J-shaped pipe including a shorter pipe having a first open end, a longer pipe having a second open end, and a connecting portion by which said shorter and longer pipes are connected with each other, such that said first and second open ends represent opposite ends of said inverted J-shaped pipe;

positioning said inverted J-shaped pipe, with said connecting portion substantially under the sea surface, such that said shorter and longer pipes extend downward from said connecting portion;

injecting the carbon dioxide-containing gas into a portion of said shorter pipe adjacent to said first open end so that seawater is forced to enter said first open end, to flow upward together with the carbon dioxide-containing gas through said shorter pipe, to flow downward through said longer pipe and to be discharged from said second open end, with the carbon dioxide being dissolved in the seawater during the passage of the carbon dioxide-containing gas through said shorter pipe; and extracting gas which remains undissolved in the seawater during the passage of the carbon dioxide-containing gas through said shorter pipe, from the seawater in said connecting portion, so that the seawater discharged from said second open end contains carbon dioxide dissolved therein.

2. A method as claimed in claim 1, further comprising introducing said extracted gas into a vertical pipe disposed under the sea and provided with an impeller of a generator, so that said extracted gas flows upward through said vertical pipe to rotate said impeller, whereby the kinetic energy of said extracted gas is recovered as electrical energy by said generator.

3. An apparatus for treating a carbon dioxide-containing gas, comprising:

an inverted J-shaped pipe including a shorter pipe having a first open end, a longer pipe having a second open end, and a connecting portion by which said shorter and longer pipes are connected with each other such that said shorter and longer pipes extend downward from said connecting portion with said first and second open ends representing opposite ends of said inverted J-shaped pipe;

injection means for injecting the carbon dioxide-containing gas into a portion of said shorter pipe adjacent to said first open end; and accumulation means in fluid communication with said connecting portion of said J-shaped pipe for collecting gas which remains undissolved in the seawater during the passage of the carbon dioxide-containing gas through said shorter pipe, from the seawater in said connecting portion, whereby, as a result of the injection of the carbon dioxide-containing gas by said injection means, the seawater is forced to enter said first open end, to flow upward together with the carbon dioxide-containing gas through said shorter pipe, to flow downward through said longer pipe and to be discharged from said second open end, with the carbon dioxide being dissolved in the seawater during the passage of the carbon dioxide-containing gas through said shorter pipe, so that the seawater discharged from said second open end contains carbon dioxide dissolved therein.

4. An apparatus as claimed in claim 3, wherein said accumulation means comprises a plurality of accumulators connected in parallel to said connecting portion through valve means controllable so that the undissolved gas is continuously collected successively in respective accumulators.

5. An apparatus as claimed in claim 3, further comprising a vertical pipe having top and bottom open ends and disposed under the sea, said vertical pipe having a portion adjacent said bottom end which is connected to said accumulation means, and a generator having an impeller provided within said vertical pipe, so that said undissolved gas collected by said accumulation means is introduced into said vertical pipe and allowed to flow upward through said vertical pipe together with seawater to rotate said impeller, whereby the kinetic energy of said undissolved gas is recovered as an electrical energy by said generator.

* * * * *